(12) United States Patent
Tamaizumi et al.

(10) Patent No.: US 9,327,760 B2
(45) Date of Patent: May 3, 2016

(54) ELECTRIC POWER STEERING SYSTEM (71) Applicant: JTEKT CORPORATION, Osaka-shi, Osaka (JP)

(72) Inventors: Terutaka Tamaizumi, Okazaki (JP); Hirozumi Eki, Okazaki (JP); Masayuki Kita, Okazaki (JP); Isao Namikawa, Okazaki (JP); Jun Hasegawa, Okazaki (JP); Akihiko Nishimura, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 22 days.

(21) Appl. No.: 14/271,973

(22) Filed: May 7, 2014

(65) Prior Publication Data

US 2014/0343794 A1 Nov. 20, 2014

(30) Foreign Application Priority Data

May 15, 2013 (JP) .................................. 2013-103240

(51) Int. Cl.
*B62D 5/00* (2006.01)
*B62D 5/04* (2006.01)
*B62D 6/00* (2006.01)

(52) U.S. Cl.
CPC ............ *B62D 5/0463* (2013.01); *B62D 5/0472* (2013.01); *B62D 6/008* (2013.01)

(58) Field of Classification Search
CPC ..... B62D 5/0472; B62D 5/0463; B62D 6/008
USPC .................................................... 701/41–42
See application file for complete search history.

(56) References Cited

U.S. PATENT DOCUMENTS

2004/0133321 A1* 7/2004 Ghoneim et al. ............... 701/41
2006/0086560 A1 4/2006 Furusho et al.

FOREIGN PATENT DOCUMENTS

| DE | 199 20 975 A1 | 4/2000 |
| EP | 1 300 320 A2 | 4/2003 |
| EP | 1300320 A2 * | 4/2003 |
| EP | 2116443 A1 * | 11/2009 |
| JP | A-2006-151360 | 6/2006 |

OTHER PUBLICATIONS

Feb. 26, 2015 Extended Search Report issued in European Patent Application No. 14167653.6.

* cited by examiner

*Primary Examiner* — Nga X Nguyen
(74) *Attorney, Agent, or Firm* — Oliff PLC (57) ABSTRACT

There is provided an electric power steering system that makes it possible to improve the driver's steering feel, and that includes a controller that controls driving of a motor. The controller computes a first assist component based on a steering torque. The controller computes a torque command value based on a basic drive torque that is the sum of the steering torque and the first assist component, and computes an assist compensation component through feedback control based on the torque command value. The controller computes a steered angle command value based on a value obtained by adding the assist compensation component to the basic drive torque, and computes a second assist component through feedback control based on the steered angle command value. The controller controls driving of the motor based on an assist command value that is the sum of the first assist component and the second assist component.

7 Claims, 10 Drawing Sheets

ELECTRIC POWER STEERING SYSTEM

INCORPORATION BY REFERENCE

The disclosure of Japanese Patent Application No. 2013-103240 filed on May 15, 2013 including the specification, drawings and abstract, is incorporated herein by reference in its entirety.

BACKGROUND OF THE INVENTION

1. Field of the Invention

The invention relates to an electric power steering system that assists a vehicle steering operation.

2. Description of the Related Art

There is a known electric power steering system that assists a driver in performing a steering operation by applying assist torque generated by a motor to a steering mechanism of a vehicle. An electric power steering system of this type is described in Japanese Patent Application Publication No. 2006-151360 (JP 2006-151360 A).

The electric power steering system described in JP 2006-151360 A includes an input torque computing unit that computes an input torque on the basis of a steering torque and a steering angle, and a virtual steering model that sets a target steering angle (target steered angle) on the basis of the input torque computed by the input torque computing unit. The electric power steering system controls driving of a motor by executing feedback control for causing an actual steering angle (steered angle) to follow the target steering angle set by the virtual steering model.

With the electric power steering system described in JP 2006-151360 A, the actual steered angle of a vehicle follows the target steered angle irrespective of the operating state of the vehicle. Therefore, a driver may not be able to gain a steering feel corresponding to the operating state. This is one of the factors that it is difficult to gain a good steering feel.

SUMMARY OF THE INVENTION

The invention is made in light of the above-described circumstances, and one object of the invention is to provide an electric power steering system that makes it possible to improve a driver's steering feel while executing steered angle feedback control.

An electric power steering system according to an aspect of the invention includes:

an assist mechanism that applies assist torque generated by a motor to a steering mechanism of a vehicle; and a controller that controls driving of the motor based on an assist command value corresponding to a target value of the assist torque.

The controller includes:

a basic assist component computing unit that computes a first assist component that is a basic component of the assist torque based on steering torque that is applied to the steering mechanism in response to a steering operation of the vehicle;

a torque command value computing unit that computes a torque command value that is a target value of the steering torque, a torque feedback control unit that computes an assist compensation component by executing torque feedback control of causing the steering torque to follow the torque command value, a steered angle command value computing unit that computes a steered angle command value corresponding to a target value of a steered angle of steered wheels of the vehicle based on a sum of a basic drive torque and the assist compensation component, a steered angle feedback control unit that computes a second assist component by executing steered angle feedback control of causing an actual steered angle of the steered wheels to follow the steered angle command value, and an assist command value computing unit that computes the assist command value based on a sum of the first assist component and the second assist component.

With the electric power steering system according to the above aspect, it is possible to improve the driver's steering feel while executing steered angle feedback control.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
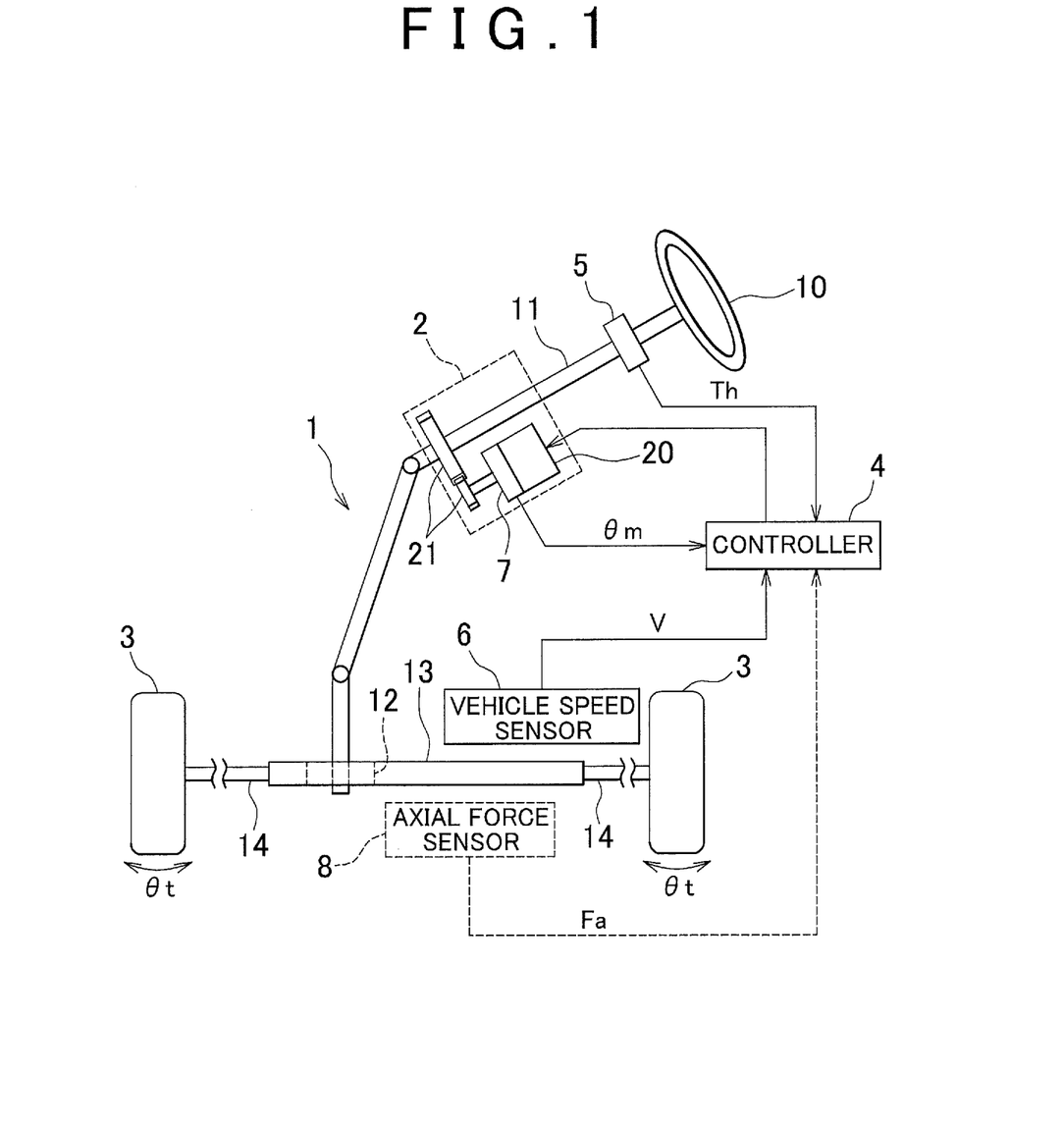
FIG. 1 is a block diagram illustrating the schematic configuration of an electric power steering system according to a first embodiment of the invention.

Hereinafter, an electric power steering system according to a first embodiment of the invention will be described with reference to FIG. 1 to FIG. 6. As illustrated in FIG. 1, the electric power steering system includes a steering mechanism 1 that steers steered wheels 3 in response to a driver's operation of a steering wheel 10, and an assist mechanism 2 that assists the driver's steering operation.

The steering mechanism 1 includes a steering shaft 11 that serves as a rotary shaft of the steering wheel 10. A rack shaft 13 is connected to the lower end of the steering shaft 11 via a rack-and-pinion mechanism 12. In the steering mechanism 1, when the steering shaft 11 is rotated in response to a driver's steering operation, the rotation of the steering shaft 11 is converted into a reciprocating linear motion of the rack shaft 13 in its axial direction by the rack-and-pinion mechanism 12. The reciprocating linear motion of the rack shaft 13 is transmitted to the steered wheels 3 via tie rods 14 connected to respective ends of the rack shaft 13, so that a steered angle $\theta t$ of the steered wheels 3 is changed and the travelling direction of a vehicle is changed accordingly.

The assist mechanism 2 includes a motor 20 that applies assist torque to the steering shaft 11. The motor 20 is a brushless motor. The rotation of the motor 20 is transmitted to the steering shaft 11 via a speed reducer 21, so that motor torque is applied to the steering shaft 11 to assist a steering operation.

The electric power steering system is provided with various sensors that detect an operation quantity of the steering wheel 10 and a state quantity of the vehicle. For example, the steering shaft 11 is provided with a torque sensor 5 that detects a torque (steering torque) Th that is applied to the steering shaft 11 in response to a driver's steering operation. The vehicle is provided with a vehicle speed sensor 6 that detects a travelling speed of the vehicle, that is, a vehicle speed V. The motor 20 is provided with a rotation angle sensor 7 that detects a rotation angle $\theta m$ of the motor 20. The outputs from the sensors are input into a controller 4. The controller 4 controls driving of the motor 20 on the basis of the outputs from the sensors.

Figure 2:
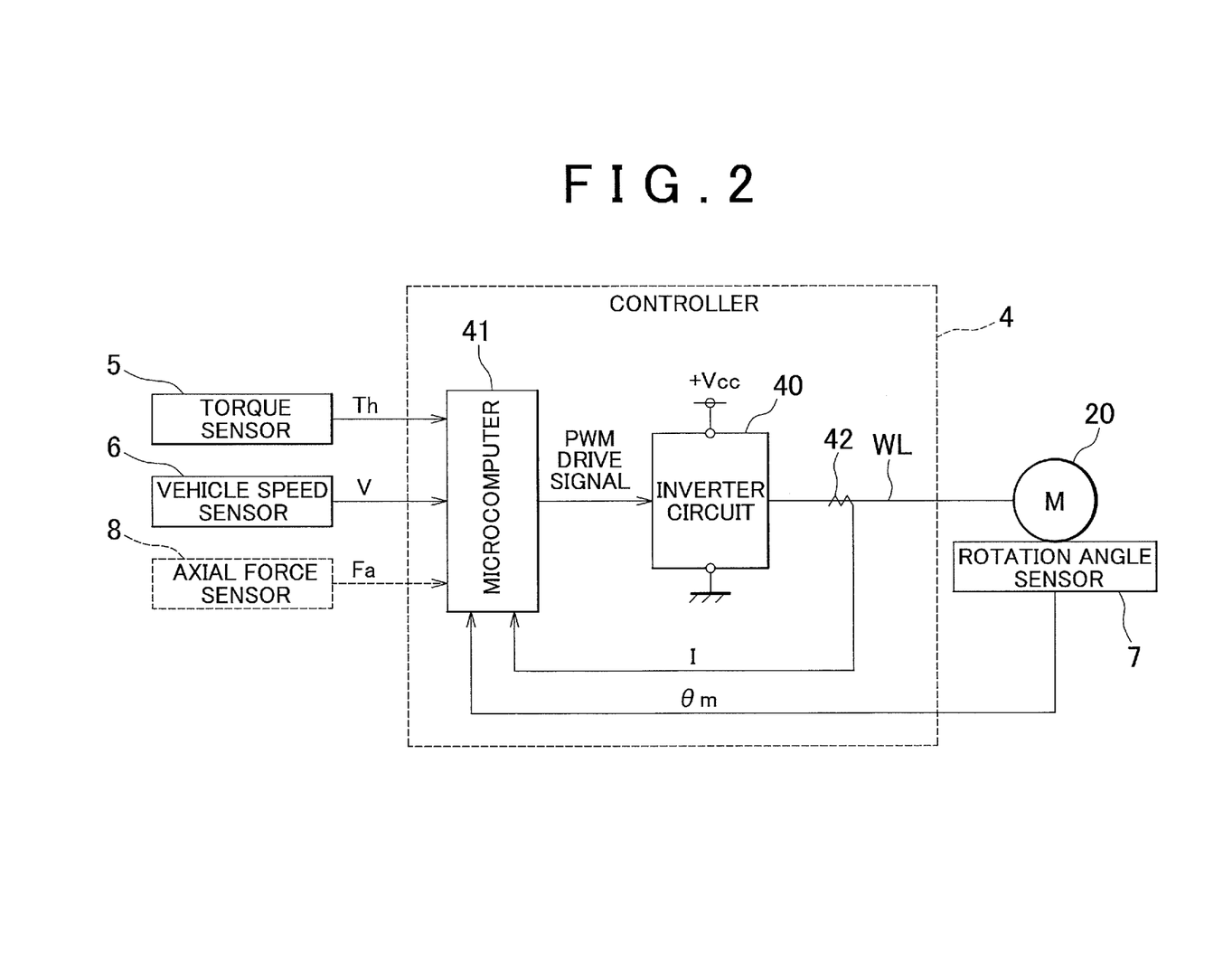
FIG. 2 is a block diagram illustrating the configuration of a controller of the electric power steering system in the first embodiment.

As illustrated in FIG. 2, the controller 4 includes an inverter circuit 40 that converts direct-current (DC) power supplied from a power source such as an in-vehicle battery into alternating-current (AC) power with three phases (U-phase, V-phase, W-phase), and a microcomputer 41 that drives the inverter circuit 40 through pulse width modulation (PWM). The output voltage of the power source is denoted by +Vcc.

The inverter circuit 40 generates three-phase AC power on the basis of a PWM drive signal from the microcomputer 41. The three-phase AC power is supplied to the motor 20 through power supply lines WL. The power supply lines WL are provided with current sensors 42 that detect three phase current values I, which are values of currents flowing through the three-phase power supply lines WL. In FIG. 2, the three-phase power supply lines WL are collectively illustrated as one power supply line WL, and the three-phase current sensors 42 are collectively illustrated as one current sensor 42. The outputs from the current sensors 42 are input into the microcomputer 41.

The outputs from the torque sensor 5, the vehicle speed sensor 6, and the rotation angle sensor 7 are input into the microcomputer 41. The microcomputer 41 generates a PWM drive signal on the basis of the steering torque Th, the vehicle speed V, the motor rotation angle $\theta m$, and the three-phase current values I detected by these sensors. The microcomputer 41 drives the inverter circuit 40 through pulse width modulation (PWM) to control the driving of the motor 20 by outputting the PWM drive signal to the inverter circuit 40.

The drive control of the motor 20 executed by the microcomputer 41 will be described below in detail. In the microcomputer 41, computations are executed by an assist command value computing unit 50, a current command value computing unit 60, and a control signal generating unit 70 illustrated in FIG. 3. The assist command value computing unit 50 computes an assist command value Tas* on the basis of the steering torque Th, the vehicle speed V, and the motor rotation angle $\theta m$. The assist command value Tas* is a parameter corresponding to a target value of the assist torque that is applied to the steering shaft 11 from the motor 20.

Figure 3:
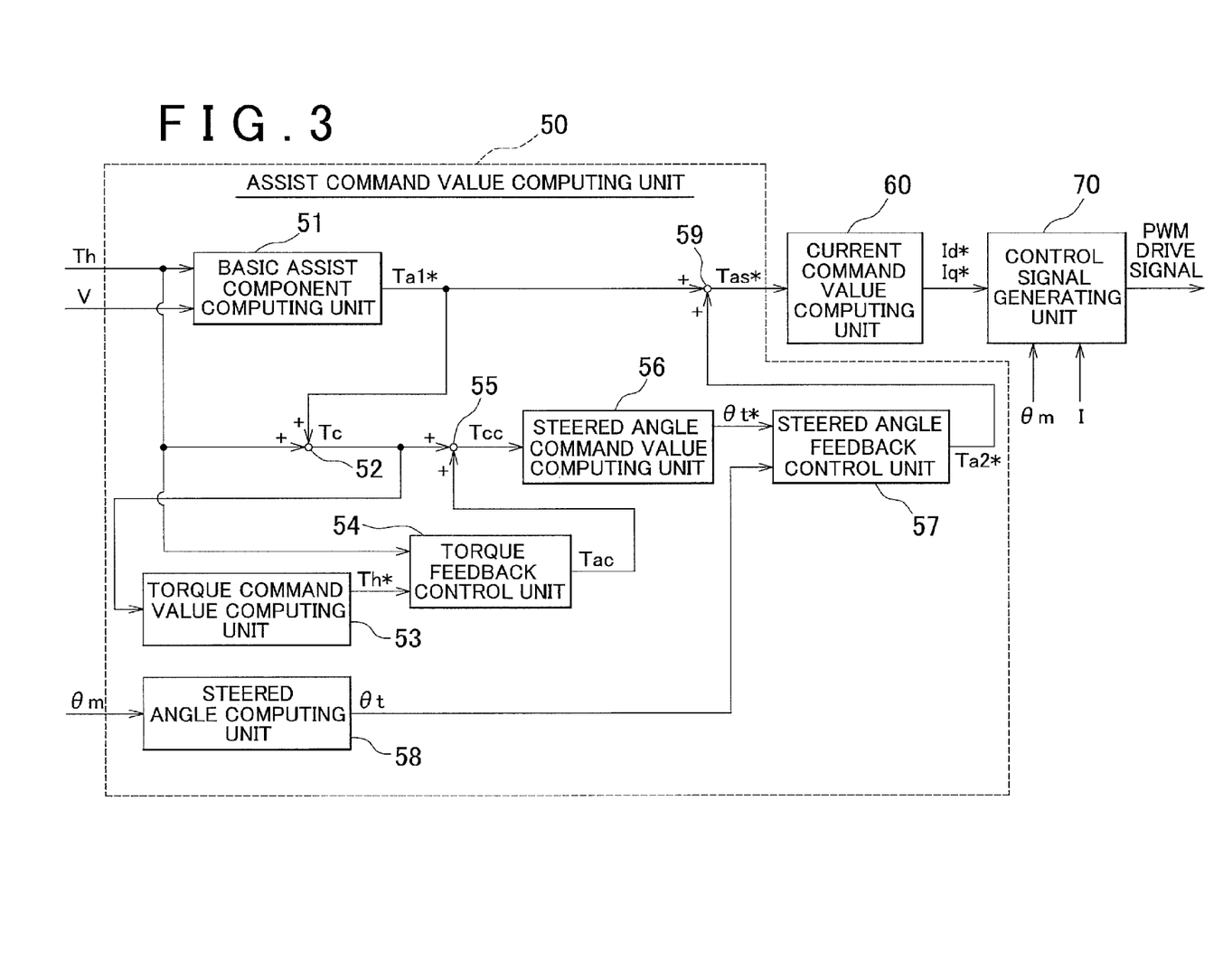
FIG. 3 is a control block diagram of the controller in the first embodiment.

The assist command value computing unit 50 includes a basic assist component computing unit 51 that computes a first assist component Ta1* that is a basic component of the assist command value Tas*. The basic assist component computing unit 51 has, for example, a map illustrated in FIG. 4, and sets the absolute value of the first assist component Ta1* to a larger value as the absolute value of the steering torque Th becomes larger and as the vehicle speed V becomes lower, on the basis of the map. The positive and negative signs of the steering torque Th and the first assist component Ta1* are set such that the steering torque Th and the first assist component Ta1* take positive values when the steering wheel 10 is steered to the right, whereas the steering torque Th and the first assist component Ta1* take negative values when the steering wheel 10 is steered to the left. As illustrated in FIG. 3, the basic assist component computing unit 51 outputs the computed first assist component Ta1* to an adder 52. The adder 52 computes a basic drive torque Tc(=Ta1*+Th) by adding the first assist component Ta1* computed by the basic assist component computing unit 51 to the steering torque Th, and outputs the computed basic drive torque Tc to a torque command value computing unit 53.

The torque command value computing unit 53 computes a torque command value Th* on the basis of the basic drive torque Tc. The torque command value Th* is a parameter corresponding to a target value of the steering torque Th. Specifically, the torque command value computing unit 53 has, for example, a map illustrated in FIG. 5, and sets the absolute value of the torque command value Th* to a large value as the absolute value of the basic drive torque Tc becomes larger, on the basis of the map. As illustrated in FIG. 3, the torque command value computing unit 53 outputs the computed torque command value Th* to a torque feedback control unit 54.

The steering torque Th in addition to the torque command value Th* from the torque command value computing unit 53 is input into the torque feedback control unit 54. The torque feedback control unit 54 computes an assist compensation component Tac by executing feedback control based on a deviation between the torque command value Th* and the steering torque Th to cause the steering torque Th to follow the torque command value Th*. The torque feedback control unit 54 outputs the computed assist compensation component Tac to an adder 55. The adder 55 corrects the basic drive torque Tc by adding the assist compensation component Tac computed by the torque feedback control unit 54 to the basic drive torque Tc computed by the adder 52, and outputs the corrected basic drive torque Tcc(=Tc+Tac) to a steered angle command value computing unit 56.

The steered angle command value computing unit 56 computes a steered angle command value $\theta t^*$, on the basis of an ideal model, from the corrected basic drive torque Tcc. The steered angle command value $\theta t^*$ is a parameter corresponding to a target value of the steered angle $\theta t$ of the steered wheels 3. The ideal model is obtained by measuring an ideal steered angle corresponding to the basic drive torque Tc in advance through experiments or the like and modeling the measurement result. The steered angle command value computing unit 56 outputs the steered angle command value $\theta t^*$ computed on the basis of the ideal model to a steered angle feedback control unit 57.

Further, the assist command value computing unit 50 includes a steered angle computing unit 58 that computes an actual steered angle $\theta t$, which is an actual steered angle of the steered wheels 3, on the basis of the motor rotation angle $\theta m$. As illustrated in FIG. 1, the motor 20 is connected to a steering shaft 11 via the speed reducer 21, and thus there is a correlation between the motor rotation angle θm and the rotation angle of the steering shaft 11. Accordingly, there is also a correlation between the motor rotation angle θm and the steered angle θt of the steered wheels 3. The steered angle computing unit 58 illustrated in FIG. 3 computes the actual steered angle θt from the motor rotation angle θm on the basis of the correlations, and outputs the computed actual steered angle θt to the steered angle feedback control unit 57.

The steered angle feedback control unit 57 computes a second assist component Ta2* by executing feedback control based on a deviation between the steered angle θt computed by the steered angle computing unit 58 and the steered angle command value θt* computed by the steered angle command value computing unit 56 to cause the steered angle θt to follow the steered angle command value θt*. The steered angle feedback control unit 57 outputs the computed second assist component Ta2* to an adder 59. The adder 59 computes an assist command value Tas*(=Ta1*+Ta2*) by adding the second assist component Ta2* computed by the steered angle feedback control unit 57 to the first assist component Ta1* computed by the basic assist component computing unit 51. Then, the assist command value computing unit 50 outputs the assist command value Tas* computed by the adder 59, as the computation result, to the current command value computing unit 60.

The current command value computing unit 60 computes a q-axis current command value Iq* in a d-q coordinate system of the motor on the basis of the assist command value Tas*, and outputs the q-axis current command value Iq* to the control signal generating unit 70. In the present embodiment, a d-axis current command value Id* is set to zero, and the current command value computing unit 60 also outputs the d-axis current command value Id* to the control signal generating unit 70.

The three-phase current values I and the motor rotation angle θm in addition to the d-axis current command value Id* and the q-axis current command value Iq* are input into the control signal generating unit 70. The control signal generating unit 70 computes a d-axis current value and a q-axis current value, which are actual current values of the motor 20 in the d-q coordinate system, by mapping the three-phase current values I onto the d-q coordinates on the basis of the motor rotation angle θm. The control signal generating unit 70 generates a PWM drive signal by computing deviations between the d-axis current command value Id* and the q-axis current command value Iq*, and the actual d-axis current value and the actual q-axis current value, and executing current feedback control based on the deviations to cause the d-axis current value to follow the d-axis current command value Id* and to cause the q-axis current value to follow the q-axis current command value Iq*. When the microcomputer 41 outputs the PWM drive signal to the inverter circuit 40, driving electric power corresponding to the PWM drive signal is supplied to the motor 20 and assist control of applying assist torque corresponding to the assist command value Tas* from the motor 20 to the steering shaft 11 is executed.

Next, the operations of the electric power steering system according to the present embodiment will be described below. In the present embodiment, as illustrated in FIG. 3, the second assist component Ta2* generated through the steered angle feedback control is contained in the assist command value Tas*. Accordingly, when the assist torque based on the assist command value Tas* is applied to the steering shaft 11, the actual steered angle θt is maintained at the steered angle command value θt*. As a result, it is possible to suppress reverse input vibrations generated in the steering mechanism 1 due to, for example, road surface conditions, or braking.

That is, even when the reverse input vibrations are transmitted from the steered wheels 3 to the steering mechanism 1, the second assist component Ta2* is adjusted such that the actual steered angle θt is maintained at the steered angle command value θt*. As a result, steering assist is executed on the steering mechanism 1 in such a direction that the reverse input vibrations are cancelled out. Thus, the vibrations of the steering mechanism 1 are suppressed. As a result, it is possible to improve a driver's steering feel.

In the present embodiment, the steered angle command value θt* is determined on the basis of the ideal model of the steered angle command value computing unit 56. That is, the driver's steering feel is determined on the basis of the ideal model. Accordingly, it is possible to realize a desired steering feel by appropriately adjusting the ideal model.

Figure 5:
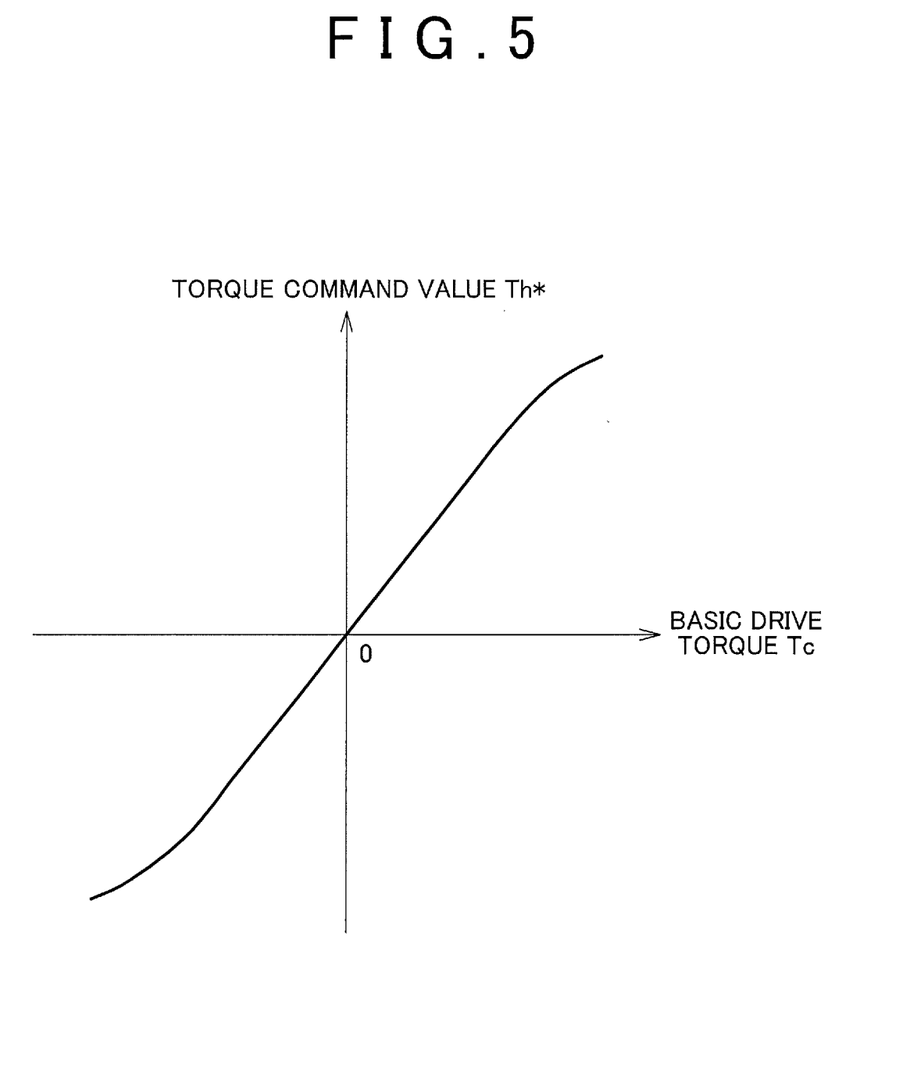
FIG. 5 is a graph illustrating an example of a map indicating the relationship between a basic drive torque Tc and a torque command value Th*.

The torque command value computing unit 53 in the present embodiment sets the torque command value Th* using the map illustrated in FIG. 5. The assist compensation component Tac is generated through the torque feedback control to maintain the steering torque Th applied by the driver at the torque command value Th*, which is an appropriate target value of the steering torque Th with respect to the basic drive torque Tc.

Meanwhile, in the present embodiment, a correction process of generating the corrected basic drive torque Tcc by adding the assist compensation component Tac to the basic drive torque Tc is executed by the adder 55. Compared with a case where the correction is not executed, the steered angle command value θt* computed by and output from the steered angle command value computing unit 56 is changed by an amount corresponding to the assist compensation component Tac added to the basic drive torque Tc. With the change in the steered angle command value θt*, the second assist component Ta2* computed by the steered angle feedback control unit 57 is changed, and consequently the assist command value Tas* is changed. That is, the assist command value Tas* is changed depending on the change in the assist compensation component Tac.

Therefore, the assist torque corresponding to the assist compensation component Tac is applied to the steering shaft 11. As a result, the steering torque Th applied by the driver is maintained at an appropriate steering torque corresponding to the basic drive torque Tc. Accordingly, it is possible to improve the driver's steering feel.

Figure 6:
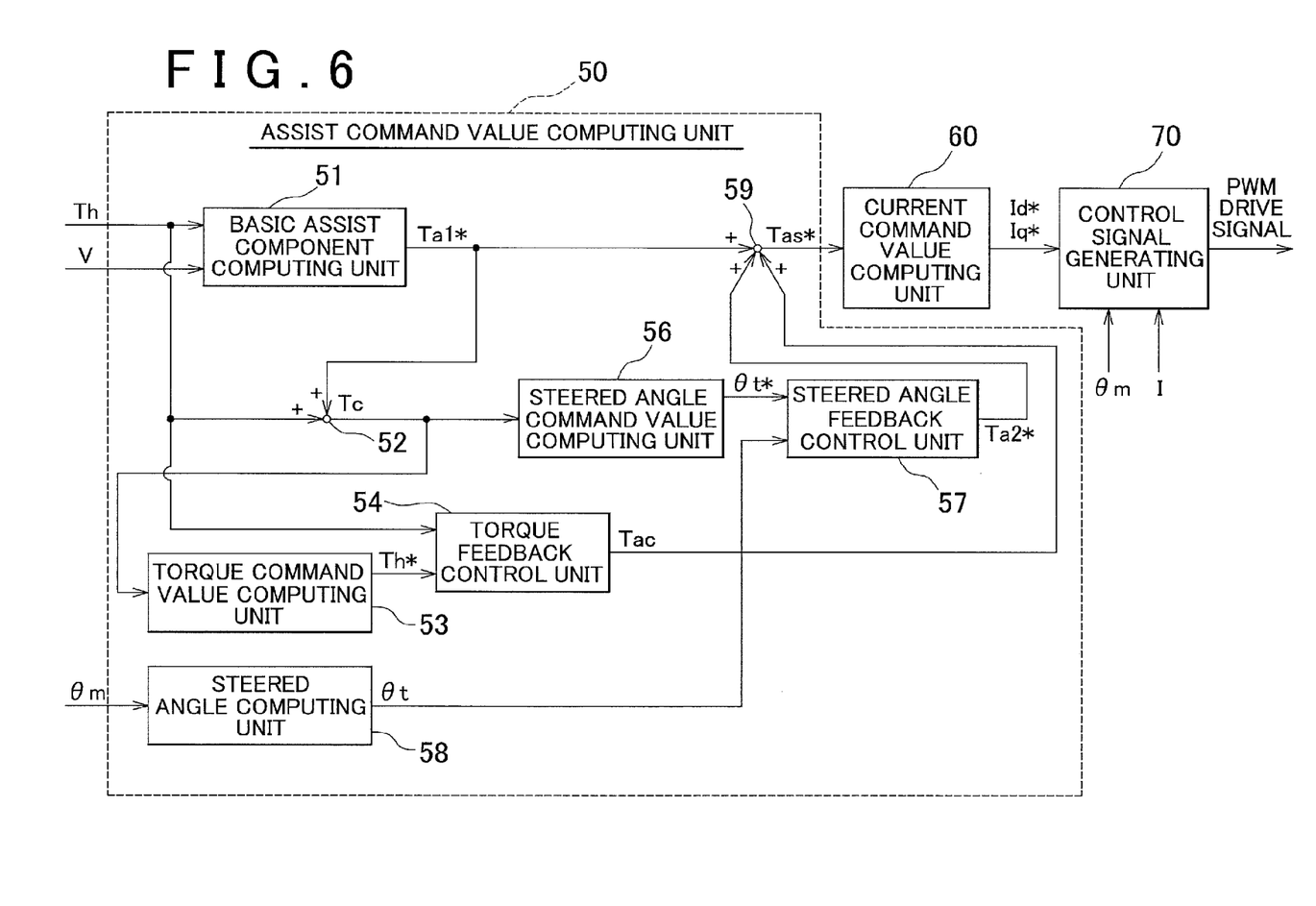
FIG. 6 is a control block diagram of a controller of an electric power steering system in a comparative example compared with the first embodiment of the invention.

As illustrated in FIG. 6, the assist command value computing unit 50 may have a configuration in which the assist compensation component Tac computed by the torque feedback control unit 54 is added to the first assist component Ta1* computed by the basic assist component computing unit 51 and the second assist component Ta2* computed by the steered angle feedback control unit 57, and the total sum thereof is used as the assist command value Tas* However, in this configuration, the steered angle command value θt* and the torque command value Th* are set independently from each other without any correlation. Accordingly, even when the assist control is executed on the basis of the assist command value Tas* illustrated in FIG. 6, it is difficult to cause the steering torque Th to follow the torque command value Th*, which is a target value, due to the influence of the second assist component Ta2* used to cause the actual steered angle θt to follow the steered angle command value θt*, which is a target value.

In other words, in the configuration of the assist command value computing unit illustrated in FIG. 6, it is difficult to cause the actual steered angle θt to follow the steered angle command value θt*, which is a target value, due to the influence of the assist compensation component Tac used to cause the steering torque Th to follow the torque command value Th*, which is a target value. When both the second assist component Ta2* and the assist compensation component Tac are contained in the assist command value Tas*, there is a possibility that an assist control system will become unstable. That is, from the viewpoint of a steered angle feedback control system, the assist compensation component Tac contained in the assist command value Tas* will be disturbance and there is a possibility that an appropriate convergence property will not be ensured. On the other hand, from the viewpoint of a torque feedback control system, the second assist component Ta2* contained in the assist command value Tas* will be disturbance and there is a possibility that an appropriate convergence property will not be ensured. The interference of the feedback controls described above may cause destabilization of the assist control system.

In contrast to this, in the present embodiment, the corrected basic drive torque Tec is generated by adding the basic drive torque Tc to the assist compensation component Tac, which is a manipulated variable of the torque feedback control unit 54, as illustrated in FIG. 3. Therefore, the steered angle feedback control unit 57 executes the steered angle feedback control on the basis of the manipulated variable of the torque feedback control. That is, the steered angle command value θt* is set so as to correspond to the torque command value Th*. Accordingly, by executing the assist control on the basis of the assist command value Tas* illustrated in FIG. 3, it is possible to cause the steering torque Th to follow the torque command value Th*, which is a target value, and to cause the actual steered angle θt to follow the steered angle command value θt*, which is a target value. That is, because it is possible to avoid the interference of the torque feedback control and the steered angle feedback control, it is possible to ensure appropriate convergence properties of the feedback controls. As a result, it is possible to ensure stability of the assist control system.

As described above, the following advantageous effect is obtained by the electric power steering system according to the present embodiment.

1) The controller 4 includes the basic assist component computing unit 51 that computes the first assist component Ta1* on the basis of the steering torque Th and the vehicle speed V. The controller 4 further includes the torque command value computing unit 53 that computes the torque command value Th* on the basis of the basic drive torque Tc, which is the sum of the steering torque Th and the first assist component Ta1*, and the torque feedback control unit 54 that computes the assist compensation component Tac by executing the torque feedback control for causing the steering torque Th to follow the torque command value Th*. The controller 4 further includes the steered angle command value computing unit 56 that computes the steered angle command value θt* on the basis of the sum of the basic drive torque Tc and the assist compensation component Tac, and the steered angle feedback control unit 57 that computes the second assist component Ta2* by executing the steered angle feedback control for causing the actual steered angle θt to follow the steered angle command value θt*. The controller 4 computes the assist command value Tas* by adding the first assist component Ta1* and the second assist component Ta2* together. Accordingly, the steering torque Th applied by the driver is maintained at an appropriate steering torque based on the basic drive torque Tc. As a result, it is possible to improve the driver's steering feel.

Next, an electric power steering system according to a second embodiment of the invention will be described with reference to FIG. 1, FIG. 2 and FIG. 7 to FIG. 9. The differences from the first embodiment will be mainly described below.

As indicated by a broken line in FIG. 1, the electric power steering system according to the present embodiment is provided with an axial force sensor 8 that detects a force (axial force) Fa that acts on the rack shaft 13 in the axial direction of the rack shaft 13 due to a road surface reaction force that acts on the steered wheels 3. That is, in the present embodiment, the axial force sensor 8 may function as a road surface reaction force detector that detects a parameter correlated with a road surface reaction force acting on the steered wheels 3. The positive and negative signs of the axial force Fa are set such that the axial force, which is generated when the steering wheel 10 is steered in such a direction that the steering torque Th takes a positive value, takes a positive value, and the axial force, which is generated when the steering wheel 10 is steered in such a direction that the steering torque Th takes a negative value, takes a negative value. The output from the axial force sensor 8 is input into the controller 4. As indicated by a broken line in FIG. 2, the microcomputer 41 generates a PWM drive signal on the basis of the axial force Fa detected by the axial force sensor 8.

Figure 7:
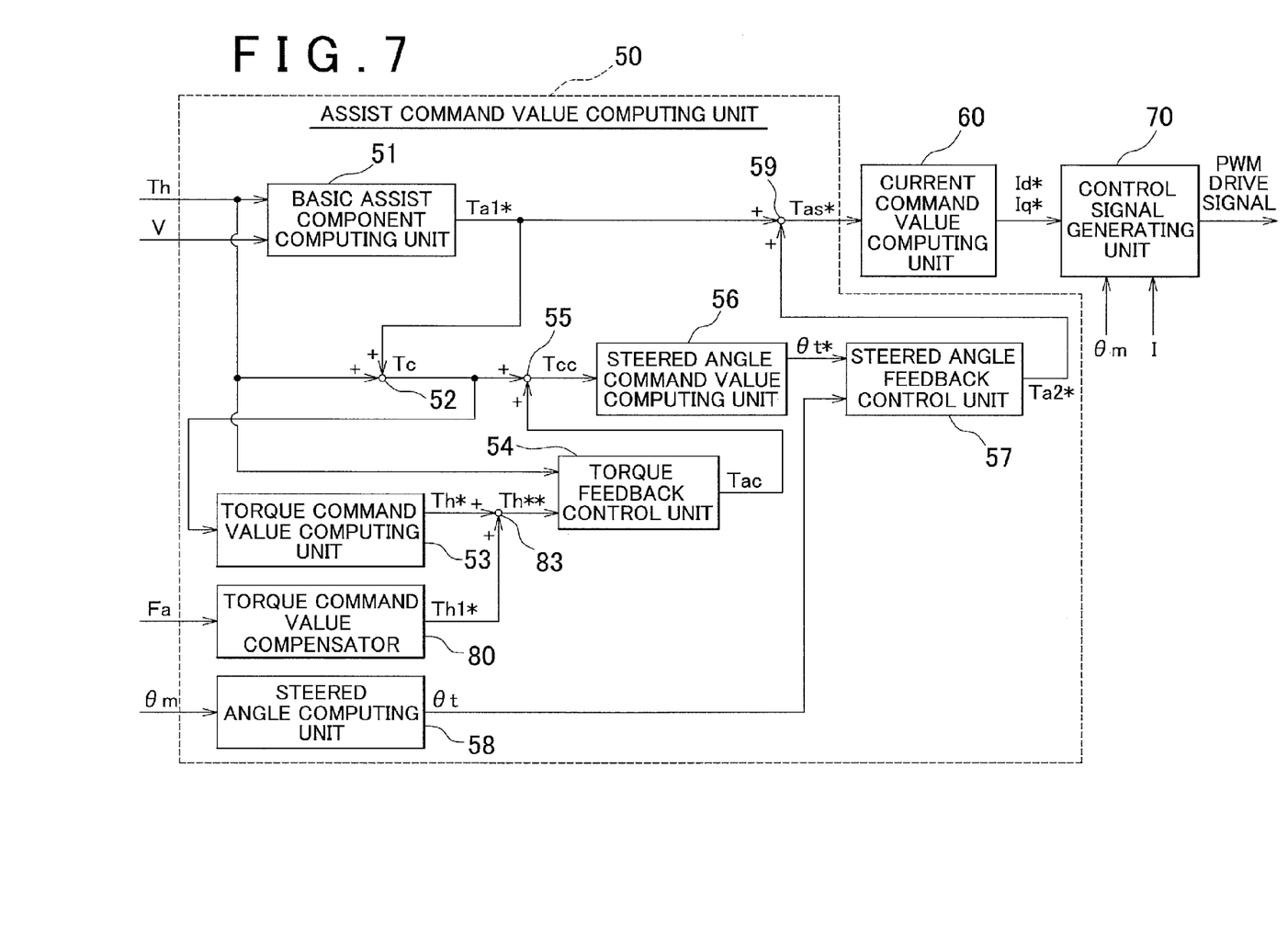
FIG. 7 is a control block diagram of a controller of an electric power steering system according to a second embodiment of the invention.
Figure 8:
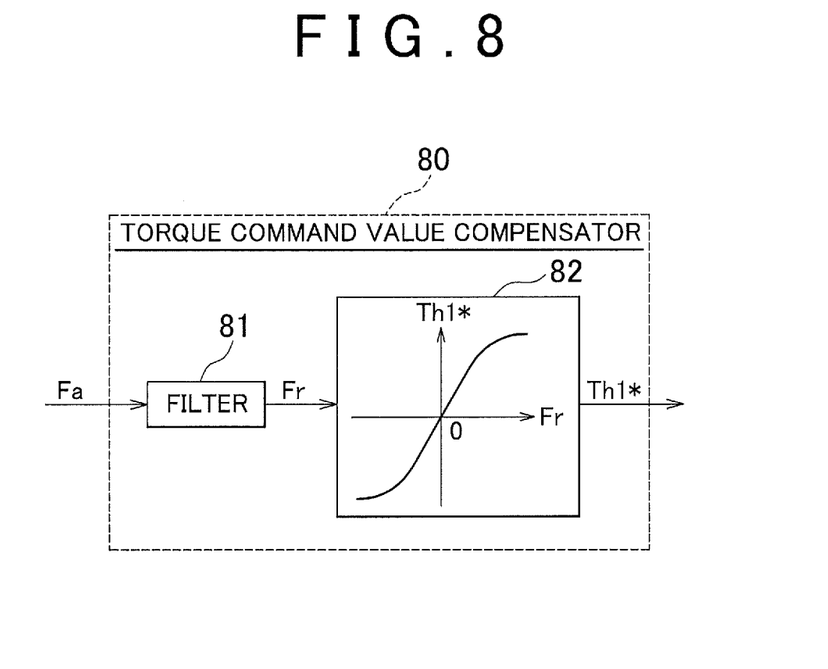
FIG. 8 is a control block diagram of a torque command value compensator of the controller in the second embodiment.
Figure 9:
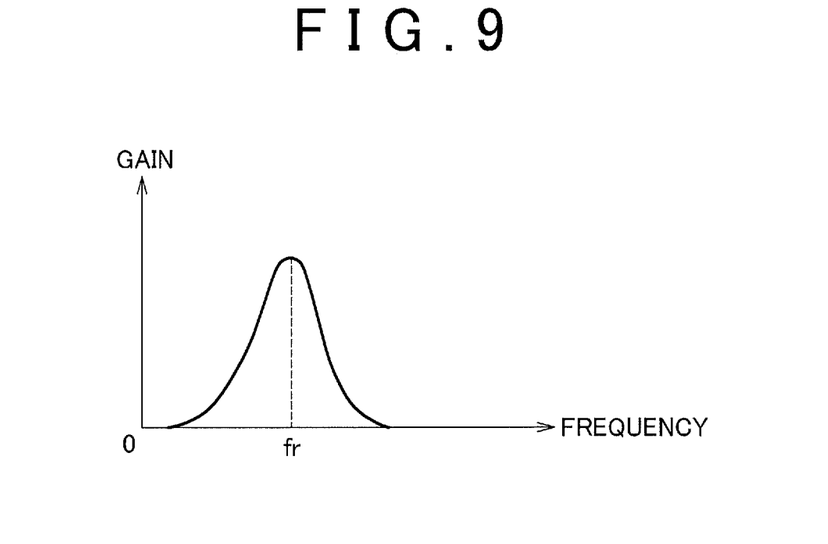
FIG. 9 is a graph illustrating an example of a pass frequency band of a filter of a torque command value computing unit in the second embodiment.

Specifically, as illustrated in FIG. 7, the assist command value computing unit 50, which is a functional part of the microcomputer 41, includes a torque command value compensator 80 that computes a compensation value Th1* on the basis of the axial force Fa. As illustrated in FIG. 8, the torque command value compensator 80 includes a filter 81 that receives the axial force Fa detected by the axial force sensor 8. The filter 81 extracts an axial force Fr acting on the rack shaft 13 due to the road surface conditions by subjecting the axial force Fa detected by the axial force sensor 8 to filtering.

The axial force Fa detected by the axial force sensor 8 contains a variety of disturbance such as an axial force acting on the rack shaft 13 due to vehicle vibrations in addition to the axial force Fr due to the road surface conditions. Accordingly, in the present embodiment, the detected axial force Fa is subjected to filtering to extract only the axial force Fr due to the road surface conditions from the detected axial force Fa. Specifically, a frequency band fr corresponding to the axial force Fr due to the road surface conditions is measured in advance through experiments or the like. Then, the filter 81 is formed of a band-pass filter having the frequency band fr illustrated in FIG. 9 as a pass frequency band. Thus, the axial force Fr due to the road surface conditions is extracted from the detected axial force Fa by passing the detected axial force Fa through the filter 81. The filter 81 outputs the extracted axial force Fr to a compensation value computing unit 82.

The compensation value computing unit 82 computes a compensation value Th1* on the basis of the axial force Fr due to the road surface conditions. Specifically, the compensation value computing unit 82 has, for example, a map illustrated in FIG. 8, and sets the absolute value of the compensation value Th1* to a larger value as the absolute value of the axial force Fr due to the road surface conditions becomes larger, on the basis of the map. The compensation value Th1* computed by the compensation value computing unit 82 is the result of computation by the torque command value compensator 80.

As illustrated in FIG. 7, the torque command value compensator 80 outputs the compensation value Th1*, which is the computation result, to an adder 83. The adder 83 compensates for the torque command value Th* by adding the compensation value Th1* computed by the torque command value compensator 80 to the torque command value Th* computed by the torque command value computing unit 53, and outputs the compensated torque command value Th** to the torque feedback control unit 54.

The operations of the electric power steering system according to the present embodiment will be described below. In the electric power steering system illustrated in FIG. 1, for example, when an axial force based on a change in the road surface conditions acts on the rack shaft 13, the axial force Fa detected by the axial force sensor 8 is changed. Accordingly, the compensation value Th1* computed by the torque command value compensator 80 is changed and the torque command value Th, which is a value input into the torque feedback control unit 54, is compensated for by an amount of the change. That is, the target value of the steering torque Th is corrected. The assist compensation component Tac is changed due to the change in the torque command value Th, and consequently the assist command value Tas* is changed. In this way, in the present embodiment, the assist command value Tas* is changed depending on the road surface conditions. That is, because the assist torque applied to the steering shaft 11 is changed depending on the road surface conditions, the driver can obtain a steering feel corresponding to the road surface conditions through the change of the assist torque. As a result, it is possible to improve the driver's steering feel.

As described above, the following advantageous effect in addition to the advantageous effect o1) in the first embodiment is obtained by the electric power steering system according to the present embodiment.

2) The controller 4 is provided with the torque command value compensator 80 that computes the compensation value Th1* on the basis of the axial force Fa that acts on the rack shaft 13 and that is detected by the axial force sensor 8. The controller 4 compensates for the torque command value Th* on the basis of the compensation value Th1*. The controller 4 computes the assist compensation component Tac by executing the torque feedback control for causing the steering torque Th to follow the compensated torque command value Th**. Thus, a steering feel based on the road surface conditions is given to the driver, and therefore the driver is able to more accurately understand the road surface conditions. As a result, it is possible to improve the driver's steering feel.

The invention may be implemented in the other embodiments #1 to #11 described below.

Figure 10:
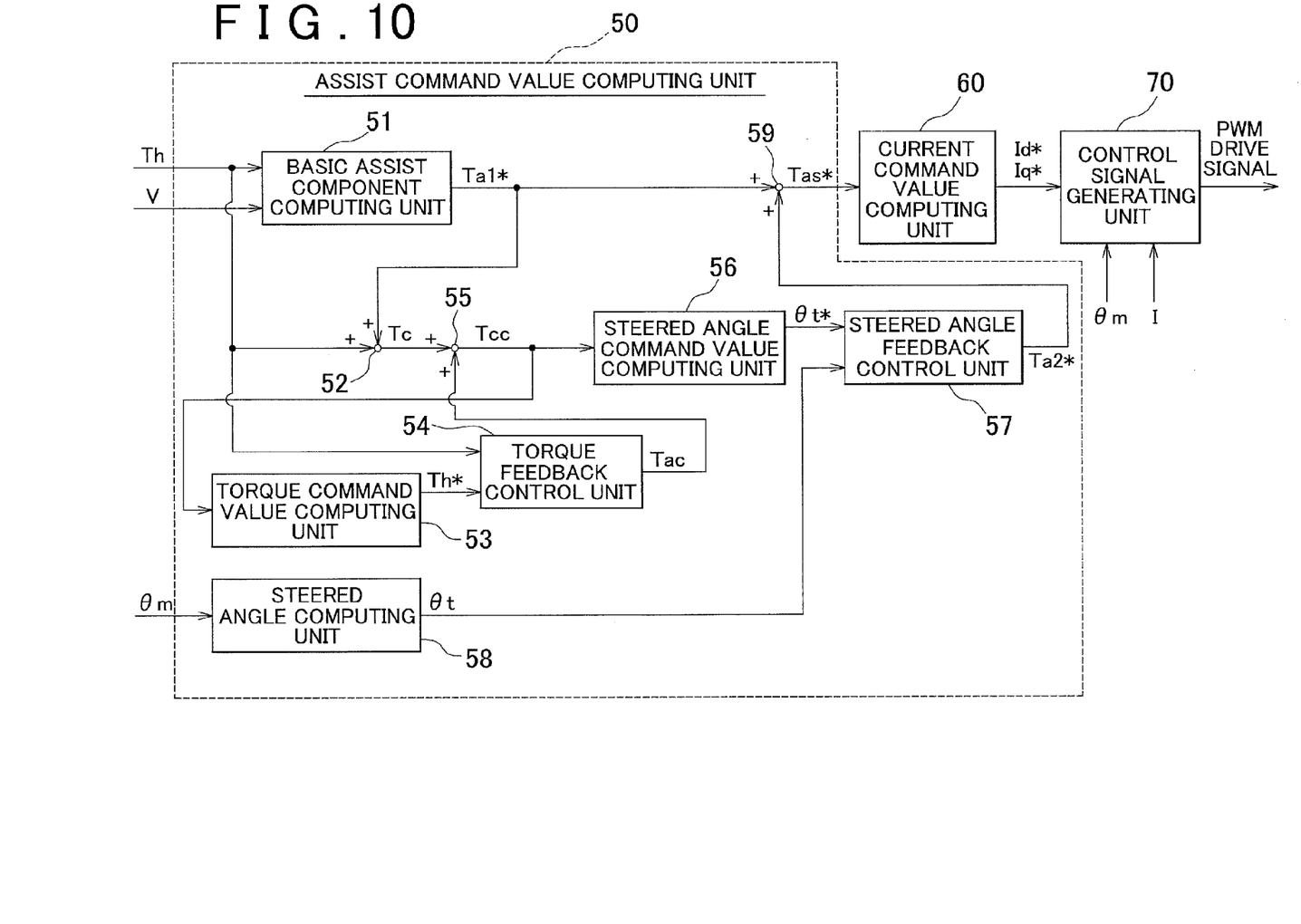
FIG. 10 is a control block diagram of a controller of an electric power steering system in a modified example of the first embodiment.

1: In the first embodiment, the basic drive torque Tc that is the sum of the steering torque Th and the first assist component Ta1* is used as the information input into the torque command value computing unit 53. Alternatively, the corrected basic drive torque Tcc obtained by adding the assist compensation component Tac to the basic drive torque Tc may be used as the information input into the torque command value computing unit 53 as illustrated in FIG. 10. The same configuration may be employed in the second embodiment.

Figure 11:
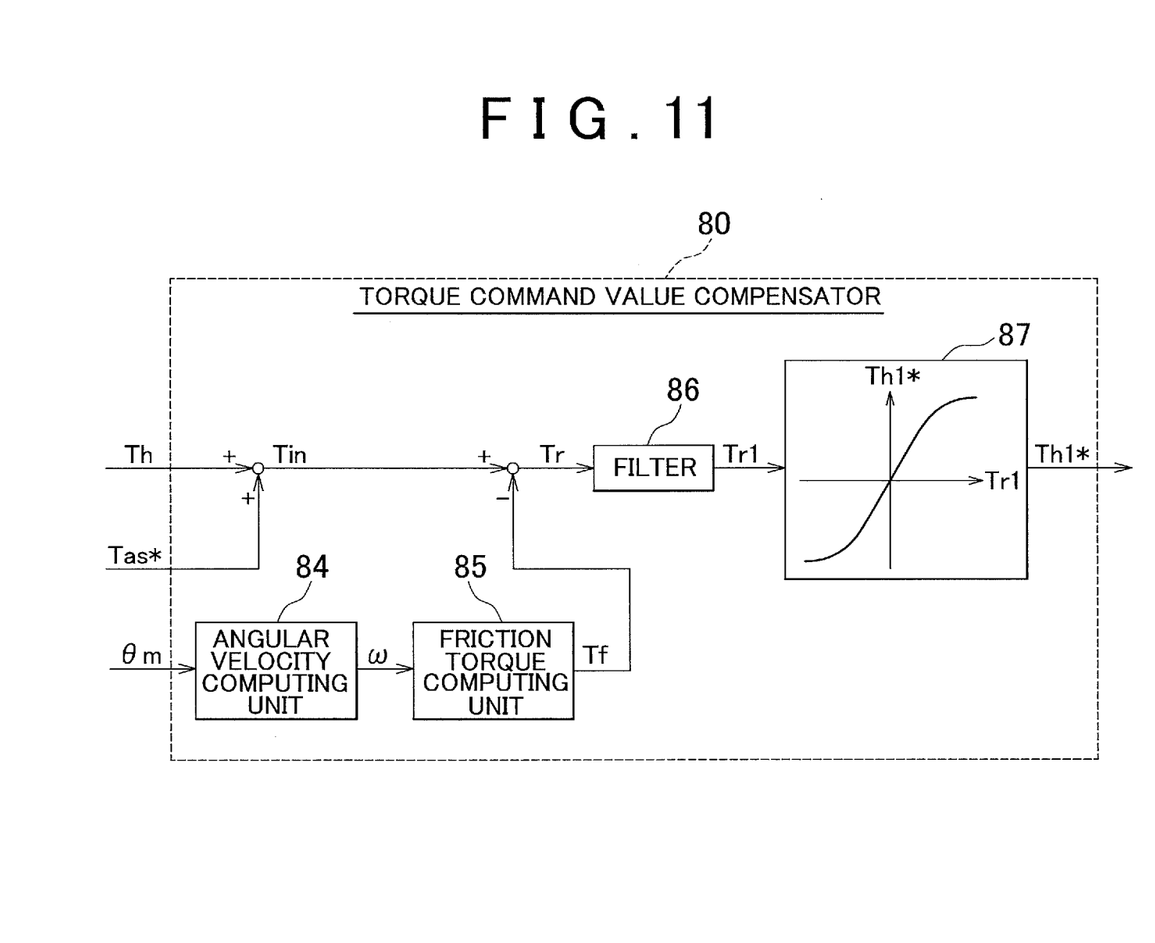
FIG. 11 is a control block diagram of a torque command value compensator of an electric power steering system in a modified example of the second embodiment.

2: In the second embodiment, the torque command value compensator 80 computes the compensation value Th1* on the basis of the axial force Fa of the rack shaft 13. However, the method of computing the compensation value Th1* may be modified as needed. For example, as illustrated in FIG. 11, the torque command value compensator 80 may compute the compensation value Th1* on the basis of the steering torque Th, the assist torque command value Tas*, and the motor rotation angle θm.

Specifically, the torque command value compensator 80 includes an angular velocity computing unit 84 that computes an angular velocity ω of the motor 20 on the basis of the temporal variation of the motor rotation angle θm. The angular velocity computing unit 84 outputs the computed motor angular velocity ω to a friction torque computing unit 85. The friction torque computing unit 85 computes a friction torque Tf on the basis of the motor angular velocity ω. The friction torque Tf is a reaction torque generated due to a variety of friction acting on the steering mechanism 1 when the steering mechanism 1 is driven. In this case, the friction torque Tf acting on the steering mechanism 1 is proportional to the angular velocity of the steering shaft 11. There is a correlation between the angular velocity of the steering shaft 11 and the angular velocity ω of the motor 20. That is, the angular velocity ω of the motor 20 is proportional to the friction torque Tf. The friction torque computing unit 85 has a map indicating the relationship between the angular velocity ω of the motor 20 and the friction torque Tf, and computes the friction torque Tf from the motor angular velocity ω on the basis of the map.

Meanwhile, the torque command value compensator 80 computes a torque Tin(=Th+Tas*) that is input into the steering mechanism 1, by adding the steering torque Th and the assist command value Tas* together. The input torque Tin is in balance with the reaction torque acting on the steering mechanism 1. The reaction torque acting on the steering mechanism 1 is mainly formed of a road surface reaction torque Tr transmitted from the steered wheels 3 to the steering mechanism 1 due to the road surface reaction force and the friction torque Tf. That is, the input torque Tin is substantially equal to the sum of the road surface reaction torque Tr and the friction torque Tf. Based on this relationship, the torque command value compensator 80 computes the road surface reaction torque Tr by subtracting the friction torque Tf from the input torque Tin.

The torque command value compensator 80 includes a filter 86 that executes filtering on the road surface reaction torque Tr. The filter 86 extracts a reaction torque component Tr1 due to the road surface conditions by removing a disturbance component due to the vehicle vibrations or the like from the road surface reaction torque Tr, and outputs the extracted reaction torque component Tr1 to the compensation value computing unit 87. The compensation value computing unit 87 has a map illustrated in FIG. 11, and computes the compensation value Th1* from the reaction torque component Tr1 on the basis of the map. With this configuration as well, it is possible to compute the compensation value Th1* due to the road surface conditions.

3: In the second embodiment, the torque command value compensator 80 computes the compensation value Th1* that changes depending on the road surface conditions. Alternatively, the torque command value compensator 80 may compute a compensation value Th1* that changes depending on the degree of slip of the vehicle. Specifically, the vehicle is provided with a steering angle sensor that detects a steering angle of the steering wheel 10 and a yaw rate sensor that detects a yaw rate of the vehicle. The torque command value compensator 80 computes an ideal value of the yaw rate of the vehicle on the basis of the steering angle of the steering wheel 10 and the vehicle speed V detected by the sensors. The torque command value compensator 80 computes a degree of slip of the vehicle on the basis of a deviation between the ideal value of the yaw rate and the actual yaw rate of the vehicle detected by the yaw rate sensor, and computes the compensation value Th1* corresponding to the computed degree of slip of the vehicle. Thus, the assist torque changes depending on the degree of slip of the vehicle. As a result, the driver is able to sense the slip state of the vehicle through the variation in the steering feel.

4: The torque command value compensator 80 may monitor whether the driver is dozing off with the use of a camera or the like mounted on the vehicle, and may change the compensation value Th1* when it is determined that the driver is dozing off while driving the vehicle. Thus, the assist torque changes when the driver is dozing off while driving the vehicle, it is possible to give an alarm to the driver by varying the steering feel. That is, the torque command value compensator 80 is an element that computes the compensation value Th1* on the basis of a detected value detected by a detector mounted on the vehicle.

Figure 4:
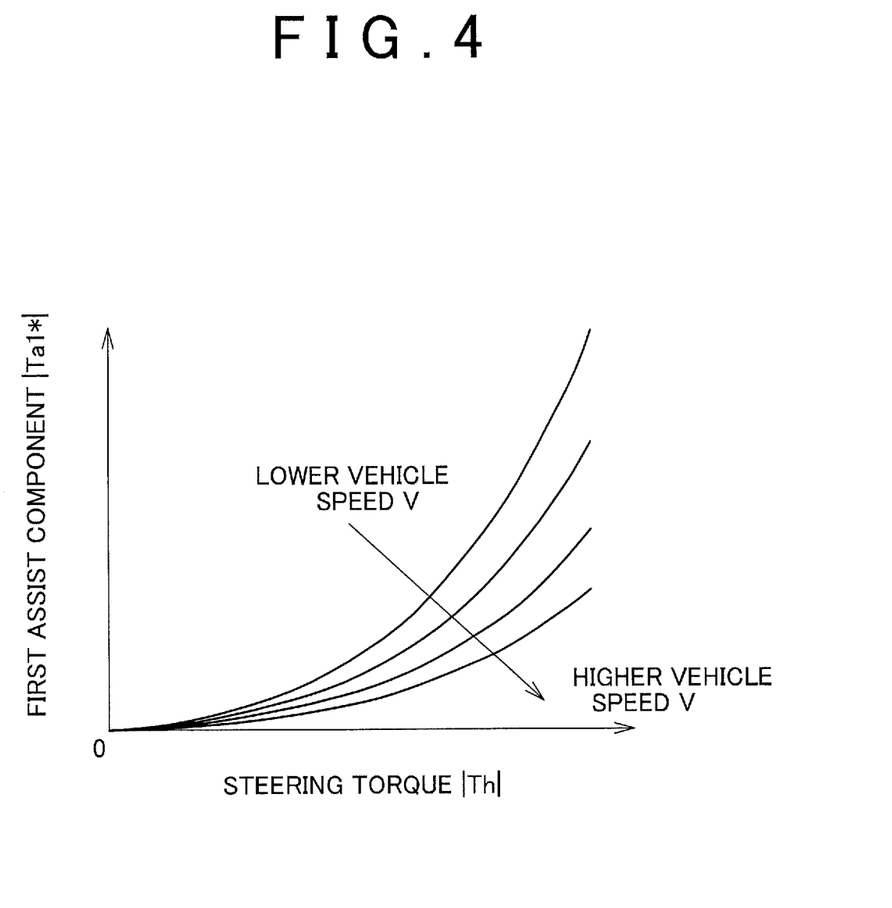
FIG. 4 is a graph illustrating an example of a map indicating the relationship between a steering torque Th and a first assist component Ta1*.

The shape of the map used to compute the first assist component Ta1* and illustrated in FIG. 4 may be changed as needed. The shapes of the map used to compute the torque command value Th* illustrated in FIG. 5 and the maps used to compute the compensation value Th1* and illustrated in FIG. 8 and FIG. 11 may also be changed as needed.

5: The steered angle command value computing unit 56 in each of the above-mentioned embodiments is not limited to an element that computes the steered angle command value θt* on the basis of the ideal model. For example, the steered angle command value computing unit 56 may be an element that computes the steered angle command value θt* through map computation, like the basic assist component computing unit 51.

6: In each of the above-mentioned embodiments, the rotation angle sensor 7 and the steered angle computing unit 58 are used as the detector that detects the steered angle θt. However, the detector that detects the steered angle θt is not limited to the rotation angle sensor 7 and the steered angle computing unit 58. For example, a steering angle sensor that detects a rotation angle of the steering shaft 11, or a sensor that directly detects the steered angle θt may be used.

7: The steered angle feedback control may be executed using an appropriate parameter that can be converted into the steered angle θt, such as the rotation angle of the steering shaft 11.

8: The basic assist component computing unit 51 sets the first assist component Ta1* on the basis of the steering torque Th and the vehicle speed V. Alternatively, the basic assist component computing unit 51 may set the first assist component Ta1*, for example, on the basis of only the steering torque Th.

9: There may be executed so-called phase compensation control of changing the phase of the steering torque Th detected by the torque sensor 5 on the basis of a rate of change (assist gradient) of the first assist component Ta1* relative to the steering torque Th.

10: There may be executed various compensation controls of compensating for the first assist component Ta1*, such as so-called torque derivative control of making the first assist component Ta1* larger as the differential value of the first assist component Ta1* becomes larger. In this case, if a value obtained by adding the compensation values computed through various compensation controls to the sum of the steering torque Th and the first assist component Ta1* is used as the basic drive torque Tc, it is possible to obtain effects of various compensation controls. In this case, the torque command value computing unit 53 computes the torque command value Th* on the basis of the total sum of the steering torque Th, the first assist component Ta1*, and the compensation values of various compensation controls.

11: The electric power steering systems according to the above-described embodiments are not limited to the electric power steering system that applies assist torque to the steering shaft 11, and each of the above-described embodiments but may be applied to an electric power steering system that applies assist torque to, for example, the rack shaft 13.

What is claimed is:

1. An electric power steering system comprising:
   an assist mechanism that applies assist torque generated by a motor to a steering mechanism of a vehicle; and
   a controller that controls driving of the motor based on an assist command value corresponding to a target value of the assist torque, wherein
   the controller includes
      a basic assist component computing unit that computes a first assist component that is a basic component of the assist torque based on steering torque that is applied to the steering mechanism in response to a steering operation of the vehicle,
      a torque command value computing unit that computes a torque command value that is a target value of the steering torque,
      a torque feedback control unit that computes an assist compensation component by executing torque feedback control of causing the steering torque to follow the torque command value,
      a steered angle command value computing unit that computes a steered angle command value corresponding to a target value of a steered angle of steered wheels of the vehicle based on a sum of a basic drive torque and the assist compensation component,
      a steered angle feedback control unit that computes a second assist component by executing steered angle feedback control of causing an actual steered angle of the steered wheels to follow the steered angle command value, and
      an assist command value computing unit that computes the assist command value based on a sum of the first assist component and the second assist component.

2. The electric power steering system according to claim 1, wherein the torque command value computing unit computes the torque command value that is the target value of the steering torque on the basis of the basic drive torque based on a sum of the steering torque and the first assist component.

3. The electric power steering system according to claim 2, wherein:
   the controller further includes a torque command value compensator that computes a compensation value of the torque command value based on a detected value detected by a detector mounted on the vehicle; and
   the torque feedback control unit computes the assist compensation component by executing torque feedback control of causing the steering torque to follow the torque command value that is compensated for using the compensation value.

4. The electric power steering system according to claim 3, wherein:
   the detector is a road surface reaction force detector that detects a parameter corresponding to a road surface reaction force acting on the steered wheels; and
   the torque command value compensator computes the compensation value based on the parameter corresponding to the road surface reaction force.

5. The electric power steering system according to claim 4, wherein the road surface reaction force detector is an axial force sensor that detects a force acting on a rack shaft in an axial direction of the rack shaft due to the road surface reaction force.

6. The electric power steering system according to claim 1, wherein the torque command value computing unit computes the torque command value that is the target value of the steering torque on the basis of a corrected basic drive torque based on a sum of the steering torque, the first assist component, and the assist compensating component.

7. The electric power steering system according to claim 3, wherein:
the detector includes a torque sensor that detects the steering torque applied to the steering mechanism and a rotation angle sensor that detects a rotation angle of the motor,
the torque command value compensator includes
an angular velocity computing unit that computes an angular velocity of the motor based on a temporal variation of the rotation angle of the motor, and
a friction torque computing unit that computes a friction torque of the steering mechanism based on the angular velocity of the motor; and
the torque command value compensator computes the compensation value of the torque command value based on the steering torque, the assist command value, and the rotation angle of the motor.

\* \* \* \* \*